United States Patent
Yang (10) Patent No.: US 8,606,225 B2
(45) Date of Patent: Dec. 10, 2013

(54) INTELLIGENT REAL TIME BILLING FOR MESSAGING

(75) Inventor: Jianchong Yang, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1240 days.

(21) Appl. No.: 12/061,359

(22) Filed: Apr. 2, 2008

(65) Prior Publication Data
US 2009/0253405 A1    Oct. 8, 2009

(51) Int. Cl.
*H04M 11/00* (2006.01)

(52) U.S. Cl.
USPC ........ 455/406; 455/466; 455/412.1; 370/352; 370/353

(58) Field of Classification Search
USPC ............... 455/406, 466, 412.1; 370/352, 353
See application file for complete search history.

(56) References Cited

U.S. PATENT DOCUMENTS

| | | | |
|---|---|---|---|
| 2005/0021562 A1* | 1/2005 | Idei et al. | 707/104.1 |
| 2007/0168228 A1* | 7/2007 | Lawless | 705/2 |
| 2008/0037554 A1* | 2/2008 | Vincent et al. | 370/395.42 |
| 2009/0016504 A1* | 1/2009 | Mantell et al. | 379/101.01 |

* cited by examiner

*Primary Examiner* — Nimesh Patel
(74) *Attorney, Agent, or Firm* — Hartman & Citrin LLC (57) ABSTRACT

Traditional systems and methods of billing for text messages for prepaid customers are improved by offering a service provider a series of features relating to intelligent and customized billing. These features include the ability to determine priority of messages sent for certain purposes such as SMS Voting, participating in contests, and other uses, and subsequently processing the billing requests generated by these messages in a dynamic manner in real time or close to real time through dynamic late-billing. The service provider has the option of arranging relevant billing requests in queues and queue groups, and allocating system resources for processing billing requests in order of priority. The end result is increased revenue for the mobile operator and greater customer satisfaction.

12 Claims, 7 Drawing Sheets

INTELLIGENT REAL TIME BILLING FOR MESSAGING

BACKGROUND OF THE INVENTION

1. Field of the Invention

The present invention relates generally to text messaging. Specifically, the present invention relates to the real time billing process for text messaging over mobile networks.

2. Background of the Invention

Wireless messaging is fast becoming a primary mode of communication between users. The increasing popularity and social acceptance of text messaging over mobile telephones has resulted in many other uses for such messaging, such as text message voting, e.g. for reality television shows. However, large volumes of time-sensitive text messages are often processed before they are billed for, especially for pre-paid subscribers. In some cases subscribers do not have sufficient funds in their pre-paid accounts to pay for the text messages being sent. If these text messages are not billed for, there is a loss of revenue for the mobile operator or service provider. Additionally, some subscribers impose a Smart-Limit (SL) on their usage. During spikes in usage, text messages may be submitted, processed, and delivered before the billing server (or similar server) has an opportunity to impose the smart limit. This results in higher than expected bills for the customer, thus lower customer satisfaction. What is needed is a more efficient system or method capable of handling large volumes of real time billing requests, including prepaid and SL, in real or close to real time.

Wireless text messaging is a huge market with tremendous revenues. Globally, the volume of text messages sent from mobile phones is worth around US$80 billion per year, and continues to grow especially in developing countries and for premium-rate services. The ubiquity of text messaging allows it to be used for a plethora of activities, receiving news, purchasing items, and getting involved in TV and radio entertainment. One example of the latter is the enormous success of reality TV programs, like American Idol or Big Brother, that combine live action with interactive texting from viewers to determine the outcome. The final of the 2005 UK edition of Big Brother generated some 6.4 million texts in a single night, at a premium rate of 50 p each, generating revenues of £3.2 million (US$ 5.9 million), to be split between the production company, the broadcaster, and the mobile service provider. Additionally, there is increasing popularity in TV programs that encourage feedback from viewers in the form of text messages. Viewers may vote for certain characters being eliminated from a TV show, or may vote for the show to take a certain direction when there is a fork in the storyline. Subscribers are willing to pay for these interactive services and thus there is potential for large amounts of revenue from offering diverse text-messaging services.

However, there are certain limitations in the existing text messaging infrastructure that prevent service providers from collecting this tremendous revenue. In a real-time prepaid messaging infrastructure today, a prepaid billing request is sent to a billing system, or a mediation gateway, for billing processing before the message is delivered by the messaging server. Sometimes the messaging server fails to receive a response for the billing request from the billing system in a timely matter. This could happen for a number of reasons including but not limited to long latency processing billing request, a billing request timeout due to overload on the billing server, etc. In this case, the prepaid billing request is logged into a file for later processing, or post-processing. The message is still delivered by the messaging infrastructure, and the billing requests in the log file are processed at regular intervals, perhaps daily or similar.

This separate process is called "late billing", and it has several drawbacks. For one, it happens too infrequently, for instance, one to two times per day. Consequently, many logged prepaid billing requests are processed too long after the message has been delivered. This does not come even remotely close to real-time billing. Additionally, there is a big risk for revenue loss when it is determined later during a late-billing process that a prepaid subscriber's account is lacking funds. The message is delivered but the revenue from this process is lost. This also applies to Smart Limits (SL) and other similar future prepaid-like messaging services where time restriction or billing processing must be handled in real time before a message can be delivered by the messaging server.

One specific example of this loss in revenue is exemplified by the trend of voting via messaging or Short Message Service (SMS). In the present SMS infrastructure, SMS voting is handled and operated individually by SMS voting complexes, similar to a Short Message Service Center (SMSC) but dedicated to SMS voting. During peak voting periods such as for TV audiences, the billing process for prepaid messaging and restriction checking for Smart Limit (SL) messaging is unable to keep up with the volume of messages being processed. For prepaid subscribers, the votes get delivered but the related billing requests are not processed until a later time via the late billing process. Thus, it is possible that prepaid subscribers get free text message votes when their accounts may be empty. In addition to reduced efficacy of the process, this causes revenue loss for the service provider.

Also, for SL messaging users, when the message is late-billed, the message is delivered before the smart-limit restriction is checked. Some postpaid subscribers invoke SL, which involves time restrictions checking on the messages for both the sender and receiver before they are delivered. Subscribers usually purchase this as part of family plans to limit the number of messages that are sent or received uncontrollably. When a SMS from a SL subscriber's device is late-billed, or post-processed, the SMS is delivered regardless of the restrictions set by the subscriber. This results in larger-than-expected bills for the owner of the account, and overall reduction in customer satisfaction.

Thus, as more applications for text messaging gain popularity such as voting, etc., and there is increased government recognition and potential usage for election purposes, there is a growing need for a more robust and reliable real-time billing mechanism for high-volume usage. What is needed is a method or system that efficiently processes a realtime billing request from a message with minimal dependence on the late billing process, or at least more efficient and smarter recognition and processing of billing requests associated with high-volume and time-sensitive messages.

SUMMARY OF THE INVENTION

The present invention provides systems and methods for increasing the revenue of service providers by efficiently processing a billing request, or similar request such as SL request. This can be achieved by providing service providers with options to automate the tasks of recognizing, grouping, and prioritizing billing requests before they inundate an overworked billing server. These options include creating priority queues for certain types of messages, and assigning system and network resources to specific queue groups for faster processing. In this way, billing requests corresponding to the high priority, most profitable and time-sensitive messages are processed closer to real-time. Billing requests corresponding to less profitable and less urgent messages are processed when more system resources become available. Thus, the present invention increases the potential for revenue generated from profitable high-volume time-sensitive messages. The present invention also improves customer satisfactions by guaranteeing that messages for high priority services are processed closer to real time.

In one exemplary embodiment, the present invention provides a system and method for minimizing the use of standard late-billing processes by using intelligent late-billing based on indicators such as message type, network status, system resources, etc. This dynamic late-billing process occurs as frequently as possible based on real-time system and environment conditions. The service provider or operator can configure a series of conditions for late billing to happen based on factors such as message type, origination or destination, payment type, cost, as well as system resources, network conditions, etc. Billing requests that may be more profitable or identified as being higher priority are processed closer to real time, and other billing requests may be saved for later processing. By allowing the late-billing process to happen closer to when the ideal relevant message was delivered, the potential for revenue loss is reduced.

In another exemplary embodiment, the present invention provides a system and method for efficiently processing billing requests during times of peak service use, such as text voting. An objective is to implement a dynamic queuing mechanism that allows optimal usage of the existing messaging infrastructure, including network bandwidth and system processing power. Messages are assigned to queues or queue groups based on factors such as payment type, origination or destination, expiration (as in the case of television contests), etc. These queues have different priorities based on the type of message being sent, and the embodiment allows the service provider to control features such as size, priority, and attributes for each queue or queue group. Billing requests in high-priority queue groups are submitted to the billing server tagged as such at higher rate. Requests in lower priority queue groups are submitted at lower rate or may be stored for dynamic late billing.

Other exemplary embodiments with network and server reconfigurations are also disclosed.

DETAILED DESCRIPTION OF THE INVENTION

The present invention improves the functionality of existing text message realtime billing infrastructures. This is achieved by introducing a set of related flexible options for the service provider to control the frequency and priority of billing requests that are submitted to the billing server. Additionally, based on the number and type of billing requests going into the billing server, the billing server may process the billing requests dynamically corresponding to the request priority based on available system resources. The logic for this functionality can be placed either within the messaging gateway, or anywhere else on the network to achieve the effect. In an exemplary embodiment, the present invention provides the ability for a service provider to define and control queue groups for billing requests during periods of high usage. This is especially applicable to scenarios such as text message voting, where it is imperative that large numbers of messages are accounted for by the billing system in a short period of time.

A "mobile device" for the purposes of this disclosure includes any communication device with the ability to send and receive data, including "text messages", across Internet Protocol (IP) or any related packet-based networks, as well as devices capable of communicating over PSTN or other legacy networks. For the purposes of this disclosure, the terms "user," "mobile user," and "subscriber" may be used interchangeably.

As used in this disclosure, "text message" refers to any electronic communication in the form of text. A "text message" may include other multimedia such as images, audio, or video, as long as it also contains an element of text. "Text messaging service" refers to any service that transfers a "text message" including but not limited to Short Message Service (SMS), Multimedia Message Service (MMS), Enhanced Messaging Service (EMS), E-Mail, or Internet instant messaging. Internet instant messaging includes services such as AOL INSTANT MESSENGER (AIM), YAHOO PAGER, and MICROSOFT WINDOWS MESSENGER. "Text messaging device" is the same as "mobile device", and refers to any device capable of sending a "text message" including but not limited to cellular telephones and computers.

Short Message Service (SMS) is a service available on most digital mobile phones, and other mobile devices like pocket-PCs, or even laptop and desktop computers. SMS permits the sending of short messages between mobile phones, other handheld devices and even landline telephones. Other uses of text messaging can be for ordering ringtones, wallpapers, and entering competitions. Messages are sent via a store-and-forward mechanism to a Short Message Service Center (SMSC), which will attempt to send the message to the recipient. If the user is not reachable at a given moment, the SMSC will save the message. When the user is reachable, the SMSC will retry the delivery process. Transmission of the messages between the SMSC and a phone can be done through different protocols within the same standard. Routing data and other metadata is added to the payload.

A Messaging Server for the purposes of this disclosure is any server designated to receive, process, and send text messages. Messaging servers include messaging gateways to allow users to send text messages from websites and other related methods. Messaging servers also include multiple messaging server complexes and associated databases. Billing Servers similarly include all or any part of a billing server complex designated to receive, process, and store billing requests. Billing servers may also include late-billing servers and associated databases.

Logic, Program Logic, configurable logic, unit, programmable unit, Rules, rule database or similar entity, priority database or similar entity, queues, queue groups, and queue databases or similar entity all represent configurations of the programmable unit and the programmable unit itself that may be stored and operated on the servers or stored in a database or similar entity connected to the servers. The rules, priorities, etc. can thus be stored either locally on the server or remotely to the server. The programmable unit offers the features and options in the present invention, and can be configured by any combination of the service provider and their affiliates. Service Provider includes mobile network operators, mobile service providers, as well as Value Added Service Providers (VSPs) and providers of other services such as text voting, television networks, and multimedia content providers.

Since the present invention may reside within an IP Multimedia System (IMS) environment it is helpful to define this term. IMS describes a system by which mobile operators can offer and charge for discrete services that are usually available on the internet, alongside current services being offered. This architecture works with any packet-switching network, is IP-based, and therefore has tremendous potential for higher-end messaging services beyond text messaging such as Multimedia Messaging Service (MMS), Mobile Instant Messaging, and other applications. In an IMS environment, the preferred signaling protocol is the Session Initiation Protocol (SIP). SIP allows two elements in a network to find each other and open lines of communication easily, and is a significant part of IMS. Ideally every mobile device and network element has a unique SIP address.

Because the invention is a combination of features that can be added to the functionality of multiple elements in the network, several potential embodiments should be apparent to one skilled in the art. For instance, the option to create queue groups and sort billing requests into these groups as well as the conditions for creating such groups stored in a database or similar data entity may be accessible via the Messaging Server itself. Additionally, the conditions for intelligent late-billing based on system and network resources may be stored in a similar database or a data entity, either in the messaging gateway, or connected to the messaging gateway, the billing/mediation gateway, or some combination of these network elements. Alternatively, the billing queue logic and intelligent-late billing units may also be accessed via and handled by the billing server.

It is also within the scope of this disclosure that combinations of messaging servers and billing servers may exist, and the configurable logic and programmable unit described herein may be distributed in parts or duplicated across these servers. Provided that the essential logic is present of allowing service providers to set up intelligent queues for billing requests and process these queues dynamically based on available resources, other issues such as placement in the network and subsequent modifications are covered by the scope of this disclosure.

Figure 1A:
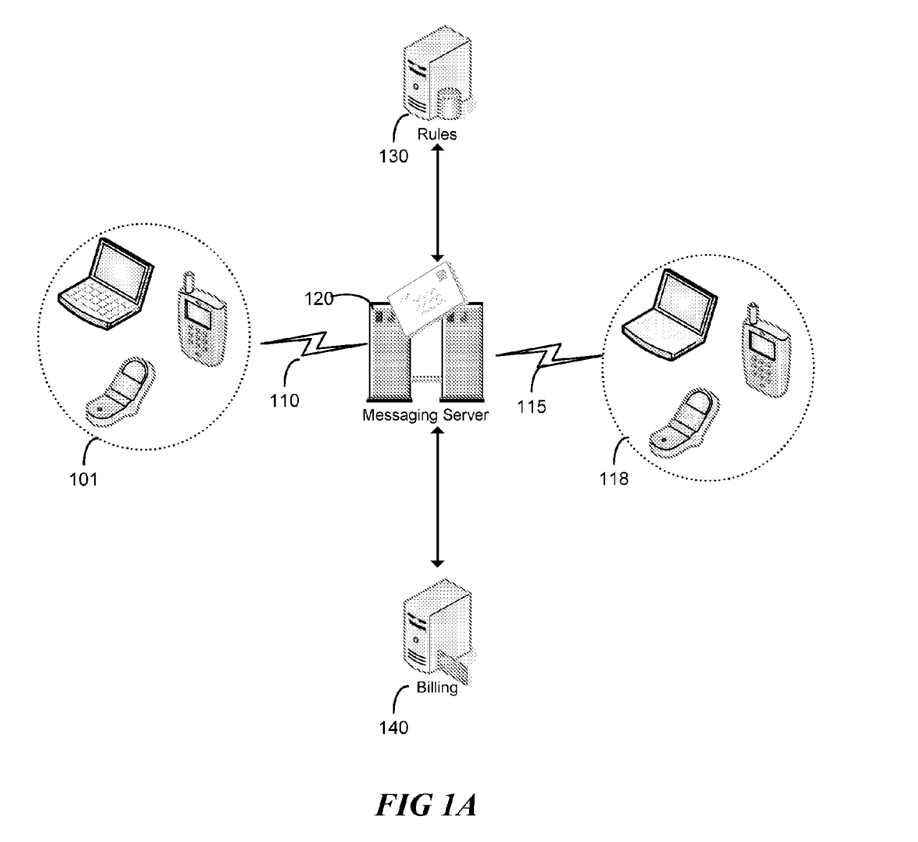
FIG. 1A shows a high-level view of a messaging server performing intelligent sorting, according to an exemplary embodiment of the present invention.
Figure 1B:
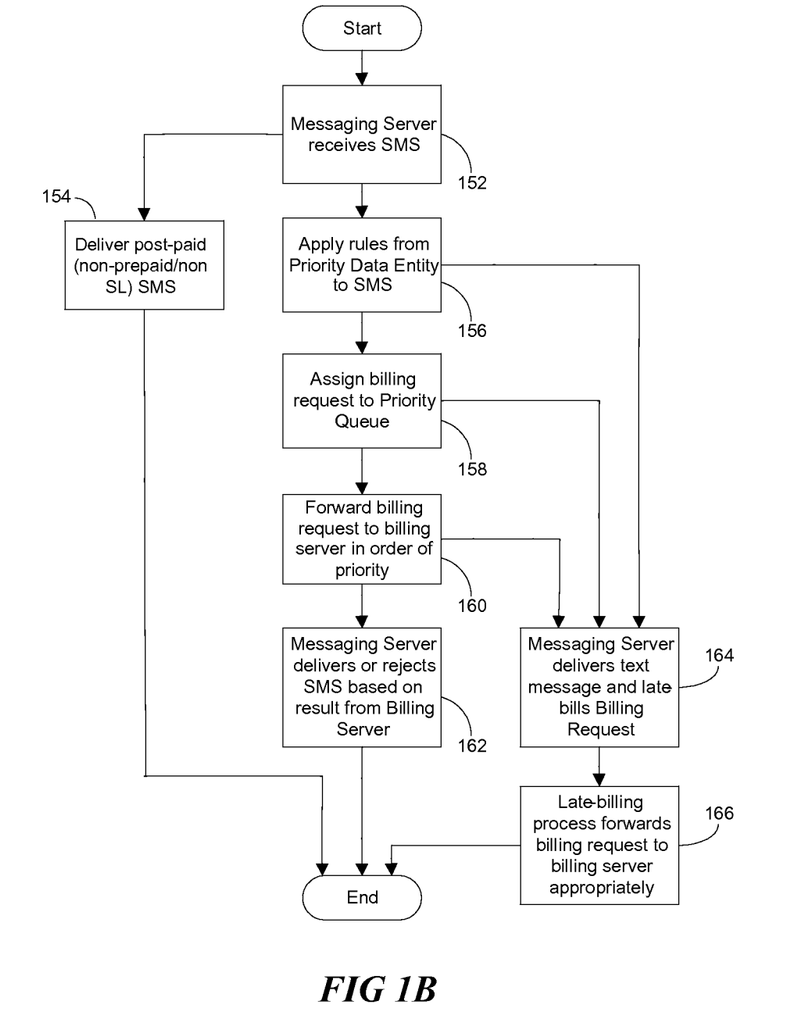
FIG. 1B shows a process flow diagram of the steps corresponding to FIG. 1A, according to an exemplary embodiment of the present invention.

FIGS. 1A-B show a high-level diagram of a system and a process flow diagram, respectively, according to exemplary embodiments of the present invention. FIG. 1A shows a messaging server communicating with a priority database or similar data entity either internally or externally to the messaging server and subsequently submitting billing requests based on priority to the billing server. A subscriber using mobile device(s) 101 sends a text message across the service provider's mobile network 110. The message traverses the network 110, including any relevant network elements, before reaching the Messaging Server 120. Messaging Server 120 is equipped with a programmable unit that allows the service provider to create a series of rules and conditions, and to store them in the priority database or similar data entity 130. For the purposes of the present embodiment, database 130 is in communication with Messaging Server 120. A programmable unit updates the Messaging Server 120 with the latest local copy of rules and conditions, usually in local memory, dynamically every time the priority database 130 is updated. For prepaid like messages (such as prepaid, SL, etc.), Messaging Server 120 observes the meta-data in the text message, and applies the rules originated from database 130 to the billing request for the message, thus assigning priority to the billing request based on the results of the rule application. Messaging Server 120 assigns the billing request to the queue or queue groups accordingly. Messaging Server 120 delivers a billing request to Billing Server 140, wherein these billing requests are submitted from a queue at rate based on their priority. Upon receiving a response from Billing Server 140 for the result of the billing request, Messaging Server 120 either delivers the message across the recipient's mobile network 115 to recipient mobile device 118 or rejects the message due to user not having enough balance in account or failing the restriction check, etc. Depending on rules and conditions, Messaging Server 120 may also deliver a message immediately while delaying the billing request for late-billing. A programmable unit processes billing requests (sends to Billing Server 140) in the late-billing log entity dynamically according to system and network conditions, other controllable indicators defined by service provider.

The exemplary steps are shown in FIG. 1B, according to the exemplary embodiment in FIG. 1A. Once the message is received 152 by Messaging Server 120, it collects information from the text message, including anything in the meta-data as well as other relevant information, and checks priority database 130 to see if any rules apply 156. For postpaid, non-prepaid and non SL message, Messaging Server 120 delivers the message 154. For prepaid and SL message, rules are applied to the billing request 156. The billing request is assigned 158 to the appropriate priority queue and dispatched 160 to billing server 140 at rate according to the priority. Based on the response result returned back from billing server 140, Messaging Server 120 either delivers or rejects the message 162. At various stages, Message Server 120 may deliver the message immediately and adding the billing request to the late-billing logging entity 164. A programmable unit processes billing requests (sends to Billing Server 140) in the late-billing log entity dynamically according to system and network conditions, plus other controllable indicators defined by the service provider 166.

Depending on the format of the text message, the meta-data may include information about the sender, recipient, binary data such as graphics, multimedia, etc. From the sender's account, it can be determined whether or not the subscriber is a smart-limit (SL), prepaid, or post-paid user. This is especially relevant because, according to an embodiment of the invention, SL billing requests automatically occupy the highest priority slots while other billing requests may join a lower priority queue, or alternatively are submitted to a late-billing system.

It can also be determined from the recipient's address (or phone number) if the recipient address is assigned to a voting service provider, or similar value-added service provider. If this is the case, then this embodiment would place the corresponding billing request in a designated queue with a specific priority. For instance, the service provider may indicate to the messaging server that billing requests for a prepaid text message vote that usually bills for $0.50 goes into a higher-priority queue than those corresponding to a prepaid text message vote that bills for $0.25, thus increasing revenue. Similarly, a service provider may prefer that a prepaid text message vote that is supposed to reach the recipient before 8 pm is put in a higher priority queue than a prepaid text message vote that still counts the following day.

Figure 2A:
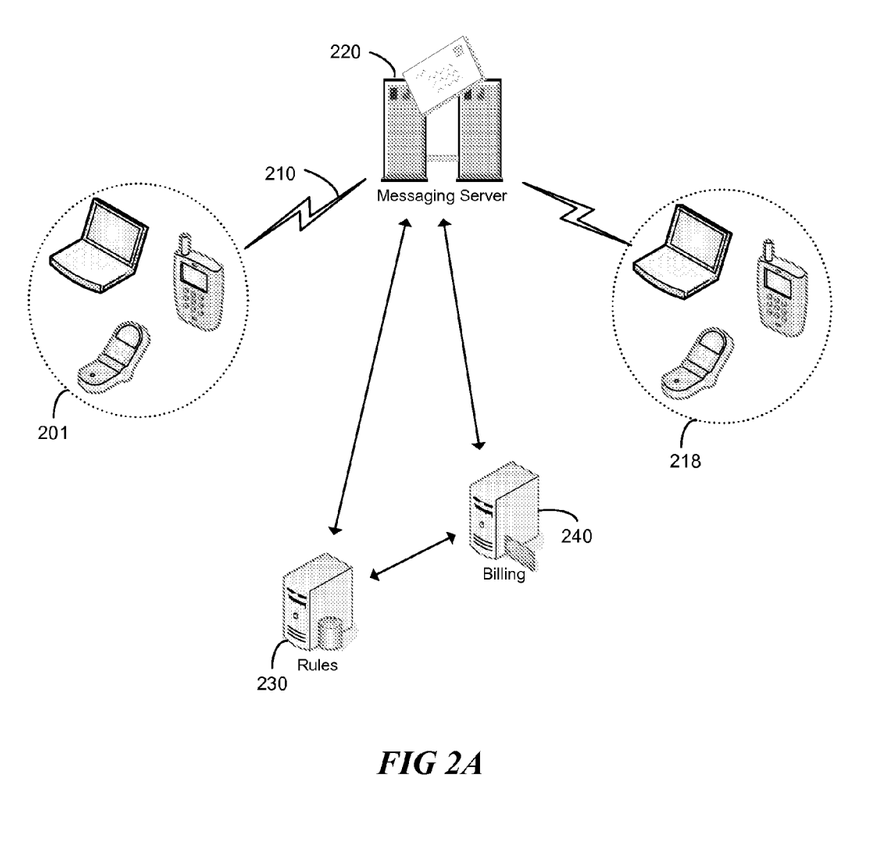
FIG. 2A shows a high-level view of a billing server that may perform intelligent sorting, according to an exemplary embodiment of the present invention.
Figure 2B:
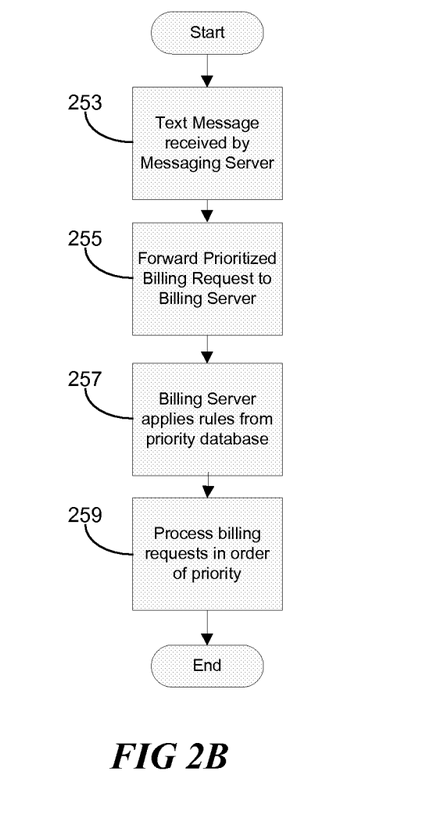
FIG. 2B shows the corresponding process flow diagram to FIG. 2A, according to an exemplary embodiment of the present invention.

FIGS. 2A-B show alternative embodiments of the present invention. FIG. 2A shows a messaging server connected to a billing server, wherein the programmable logic is accessible from either or both servers. Whereas in the previous embodiment the program logic was configured and accessed via the Messaging Server, the system in this embodiment can be configured to allow the Billing Server to act as host for the program logic.

Subscriber on mobile device(s) 201 sends a text message across mobile network 210. Messaging Server 220 is programmed like a traditional messaging server, wherein it submits the billing request to Billing Server 240 and delivers the relevant message to recipient 218 or rejects the relevant message based on billing result returned from the Billing Server 240. According to the present embodiment, billing server 240 is hosting the program logic and is in communication with the priority database 230. In this case, billing server 240 is able to make the determination based on the billing request whether or not rules from the priority database will apply. For instance, based on the amount being charged to sender 201, the billing requests may be prioritized in descending order of cost (if the rules are made as such). Then billing server 240 processes the billing requests in order of priority.

The steps in this method are shown in FIG. 2B, according to the exemplary embodiment described above. Once the message is received 253 by Messaging Server 220, it is processed as usual and a corresponding billing request is submitted 255 to Billing Server 240. Billing server 240 then applies rules 257 from priority database 230 to each billing request, and assigns them a value and/or a priority group. Billing server 240 processes 259 the billing requests and priority groups in order of priority, and may delegate some tasks to late-billing and others for immediate billing, based on available system resources.

One of the many features in the present invention that increases the efficiency of the billing process is the ability to differentiate between different types of billing requests and services, for instance between prepaid, Smart Limit, and other prepaid like services. This parallel processing of billing requests allows a billing server to intelligently process requests in a way that provides maximum revenue rather than simply lining up requests and processing them as in the prior art. The present embodiment allows the service provider to define and control specific configuration properties such as the number of request queues, assignment of queue groups, priority assignment for queue groups, and assignments of specific messaging services to queue groups.

Additionally, the ability to control how queue groups share system resources adds to the efficiency of the disclosed methods and systems. Each queue group may be assigned a certain percentage of system resources and bandwidth. When the billing server encounters a specific type of message, such as a prepaid vote, the system will send the request to an assigned queue group. The Messaging server or billing server balances resources among entries within a queue group as well as among groups. Lower priority queued items and groups may be processed at lower rate or later. As described above, the ability to control and modify conditions for priority, such as the price of the message as well as the urgency of the message, allow for greatly increased revenue on the part of the service provider(s) and increased customer satisfaction.

Figure 3:
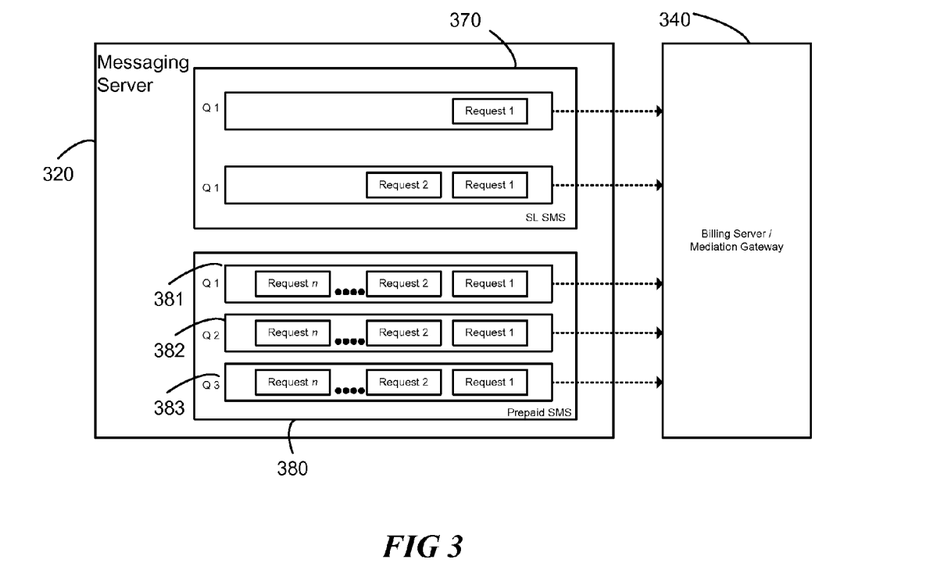
FIG. 3 shows a series of priority queue groups for billing requests, according to an exemplary embodiment of the present invention.

FIG. 3. shows a series of billing requests organized into queue groups and assigned various priorities, according to an exemplary embodiment of the present invention. In this case, messaging server 320 is handling two queue groups, one for smart limit (SL) SMS messages 370, and another for prepaid SMS messages 380. The prepaid SMS queue group 380 includes three queues each having a series of requests 1 to n, where n is the total number of requests in each queue. In this exemplary embodiment, number of requests in each queue in queue group 380 is the same. Further, queues within a group may be assigned different priority for various reasons. First queue 381 may have higher priority than any other, perhaps because queue 381 is billed at a higher rate than either of the other two queues. In a similar fashion, second queue 382 may be ranked higher than third queue 383 because second queue 382 consists of a series of SMS votes that have to be submitted earlier than the messages in third queue 383.

In either case, priority in the form of greater bandwidth and system resources is given to higher priority queues. In the present example, the SL SMS queue group 370 is assigned a higher priority. Thus, a higher percentage of system resources is allocated towards processing this queue group and billing requests in SL queue groups 370 are processed at higher rate. When billing requests in SL queue group are all completed or the number of billing requests falls below a specified threshold, the programmable unit may dynamically allocate more system resources to lower priority queue groups so billing requests in those groups will be processed faster. Finally, the embodiment in FIG. 3 shows the configurable logic residing on Messaging server 320; however, it should be apparent that this process could also occur on the billing server 340, or on a unit residing within a separate network element that is accessible by the other network elements.

Figure 4:
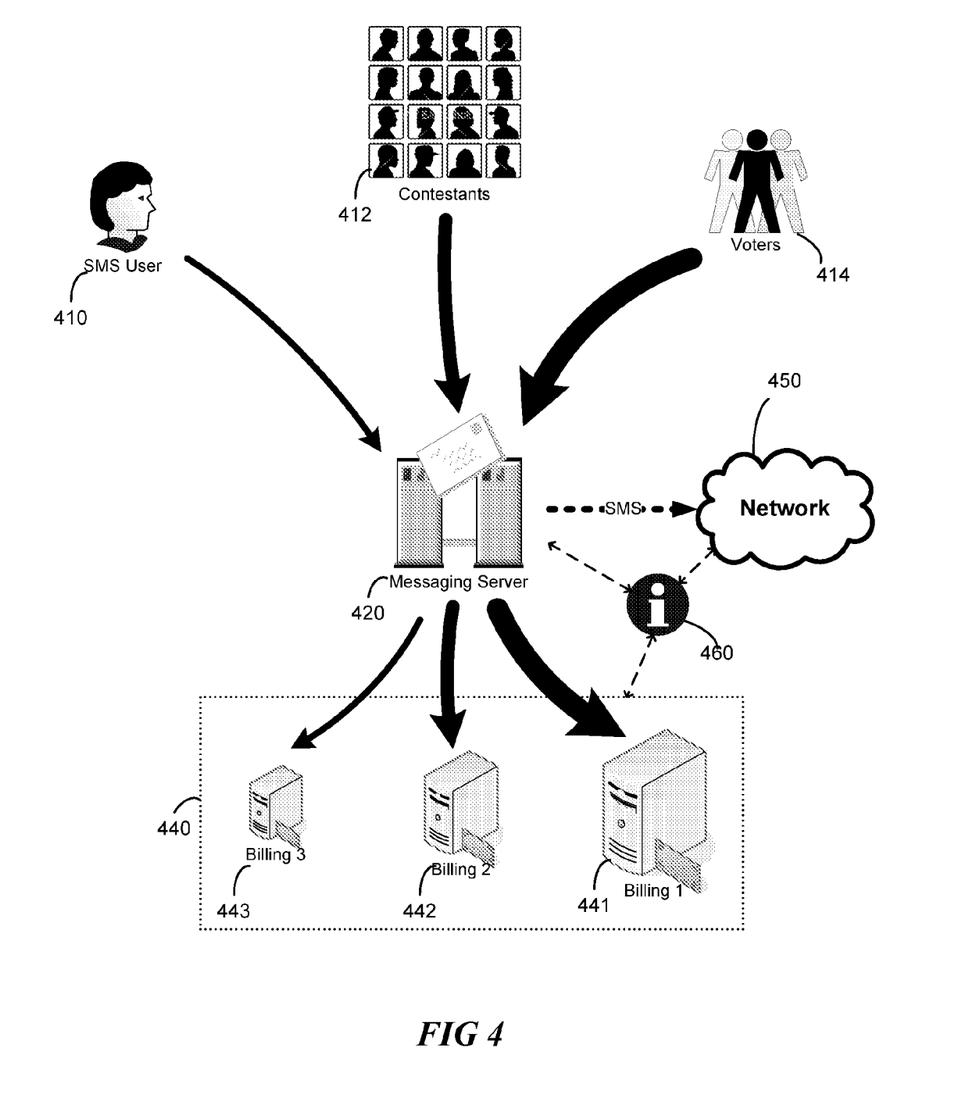
FIG. 4 shows a typical voting and text messaging scenario as processed by the messaging server, according to an exemplary embodiment of the present invention.

It should be apparent that there are several properties of a message that can allow it to be categorized in different priority queue groups based on the service provider's preferences. The purpose is to offer a service provider with the flexibility to prioritize different messages based on the circumstances. One such environment is shown in FIG. 4. The programmable unit is located within the messaging server/voting complex 420, which is connected to message senders 410, 412, and 414, as well as to recipient network 450 and Billing Servers 440 (including servers 441, 442, 443). Messaging server 420 and billing servers 440 are also able to access information on system and network resources 460.

FIG. 4 exemplifies a typical scenario day in the life of messaging server 420. Three types of users are submitting text messages. SMS user 410 is a single subscriber who uses SL-SMS, regular postpaid, or prepaid SMS services. Subscriber 410 sends a single text message to recipient network 450. Subscribers 412 are a number of contestants who are participating in a TV or radio show, but from their own homes. This is one growing example of text messaging users. This could either work as a quiz/Q&A contest where the first winning text message gets a prize or perhaps as a lottery where one winner is picked from a series of contest entries, wherein each entry is one message. Finally, Subscribers 414 are a number of voters who submit text message votes for any number of applications. For instance, they may be voting as to direction they would like the storyline to take as described in the background. Additionally, these viewers could include those that are watching a televised debate about a certain bill being discussed by the government, and may be allowed to vote for or against the bill. Or they could be viewers voting for their favorite singers in a singing competition show. As is apparent, these situations require some level of urgency in processing these messages and counting the votes before a decision is made.

The thickness of the arrows connecting the users to messaging server 420 is indicative of the volume/urgency of the messages being sent. Similarly, the thickness of the arrows connecting messaging server 420 to billing servers 440 is indicative of the priority assigned to those messages. Messaging server 420 delivers regular postpaid messages immediately. For non-regular postpaid messages such as prepaid and postpaid SL messages, Messaging server 420 refers to priority rules indicated by the service provider, and assigns each text message's billing request a specific priority queue group as described in FIG. 3. In this embodiment, higher priority queue groups are submitted to a more powerful billing server, as indicated in the figure by the size of the billing server. First billing server 441 is the most powerful, or is allocated the largest amount of system resources. Thus, messaging server 420 submits billing requests corresponding to voters 414 to billing server 441 for fastest processing, thus maximizing the revenue generated by those subscribers. Similarly, contestant 412 entries generate billing requests that are submitted to second billing server 442 for medium-priority processing, and the single SMS user's message is processed by low-priority server 443, or may be late-billed. In another scenario, 441, 442 and 443 in FIG. 4 may also represent the number of billing processes in a billing server or cluster, with 441 having more billing processes taking more system resources and 443 having least billing processes and taking least amount system resources.

Processing the billing requests as prioritized is handled mostly by the billing servers 440. These may be separate servers within a network, or they may be units located within the same server but assigned different priorities and resources. In addition, to allocate and provide the most efficient configuration of system resources, it is necessary to monitor network conditions and overall system usage as indicated by the "i" 460. As shown, this information is accessible by every network element, and is vital in determining priority of the queue groups as well as dividing system resources in processing these queue groups. This information is also useful in determining late-billing procedures, as described later in this disclosure.

Figure 5:
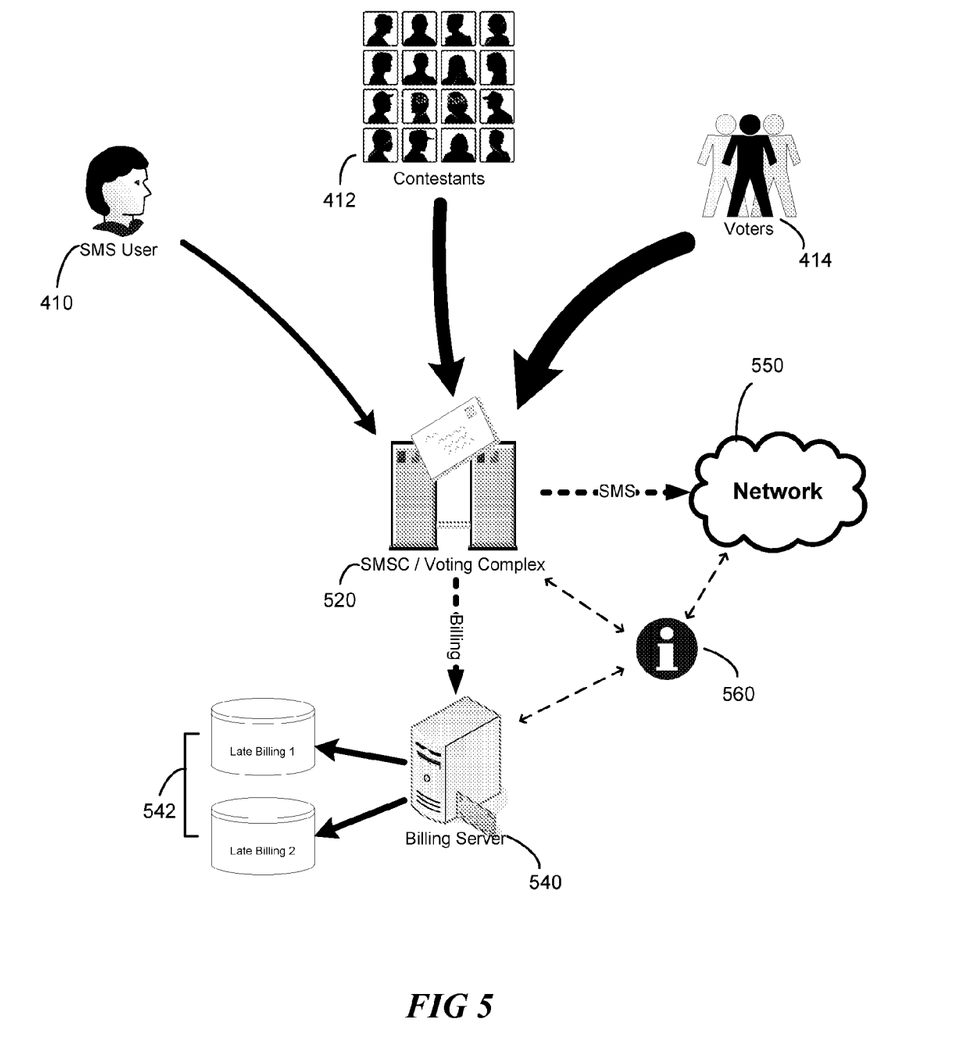
FIG. 5 shows another potential voting and text messaging scenario as processed by the billing server, according to an exemplary embodiment of the present invention.

FIG. 5 shows an alternative to the above described embodiment. In FIG. 5, messaging server 520 acts as a traditional messaging server and the programmable logic is situated on the billing server(s) 540. The three types of subscribers 410, 412, and 414 are, as described above, single user, game show contestants, and voters, respectively. In this embodiment, messaging server 520 receives the regular postpaid text messages and processes them/forwards them to mobile network 550. In case of non-regular postpaid messages, messaging server 520 forwards billing requests for all the messages to the billing server complex 540. At this point, billing server 540 assigns each billing request a specific priority queue group. In this embodiment, higher priority queue groups may be processed immediately, with secondary and tertiary groups stored in late billing databases 542 to be processed when system resources become available. High-priority messages are delivered or rejected by messaging server 520 based on results returned from the billing server 540. Messages of secondary and tertiary priority are delivered by messaging server 520; the billing requests in the late billing database are processed later accordingly. Alternatively, late billing databases 542 may be replaced with billing servers that are assigned lower system resources. A hybrid system where late billing occurs dynamically on different levels based on different priorities is an exemplary embodiment of the invention. Finally, information on system resources 560 is relevant when determining how to allocate such resources.

Thus, in the present embodiment, billing requests associated with the voters 414 may receive highest priority because they are the most time sensitive, expensive, and highest in volume. These would ideally be processed immediately. Contestants' 412 entries may be assigned secondary priority and billed later or allocated fewer system resources during processing. Similarly, the billing request corresponding to single SMS user 410 is saved for late billing that will be dynamically processed as system resources become available.

The dynamic late-billing mechanism involves certain helpful features. First, it allows the service provider to control how and when the late-billing process starts, how often it runs, and what types of system factors are monitored. This method may also monitor up-to-date real-time system and environment conditions regularly. For instance, the service provider can program the messaging server to identify every five minutes the level of system CPU usage and the percentage of bind usage for network connections to the billing/mediation gateway. Finally, this method schedules and automatically triggers late billing processes either regularly or when a set of preconfigured conditions are met.

It is possible that real-time system status and condition monitoring are not needed. This will default the mechanism to a regular late-billing process model, for instance to clear the late-billing log every five minutes. However, this is may not be a preferred approach. By blindly running late-billing processes at an increased frequency it is possible that more stress will be added to the already busy system.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for billing a subscriber for a text message, the method comprising:
 creating a plurality of priority rules;
 applying the plurality of priority rules to meta-data of the text message received from the subscriber;
 assigning a priority value to a billing request corresponding to the text message, the priority value being based on the application of the plurality of priority rules;

processing the billing request in order of the priority value, wherein a billing request corresponding to a category including at least one of a smart limit text message and a text message transmitted to a voting service provider is assigned a highest priority;

grouping together billing requests having similar priorities to create a plurality of priority queues; and grouping together priority queues to create a plurality of priority queue groups, wherein processing the plurality of billing requests in order of the priority further comprises allocating system resources to the processing of a priority queue when appropriate, and wherein the allocation of system resources corresponds to the priority value assigned to the priority queue group.

2. The method of claim 1, wherein the plurality of priority rules are determined by the service provider.

3. The system method of claim 1, further comprising allocating a percentage of system resources corresponding to the priority value of said priority queue group.

4. The method of claim 3, wherein the priority queue group with a highest priority value is allocated a higher percentage of system resources than a priority queue group with a lower priority value.

5. The method of claim 1, wherein the text message relates to a vote for a poll.

6. The method of claim 1, wherein the text message relates to a contest.

7. A method for billing a subscriber for a text message, the method comprising:

creating a plurality of priority rules;

receiving the text message from the subscriber, the text message comprising meta-data;

applying the plurality of priority rules to the meta-data of the text message;

assigning a priority value to a billing request corresponding to the text message, the priority value being based on applying the plurality of priority rules to the meta-data;

processing the billing request in order of the priority value, wherein a billing request corresponding to a category including at least one of a smart limit text message and a text message transmitted to a voting service provider is assigned a highest priority;

grouping the billing request with billing requests having similar priorities to create a plurality of priority queues; and grouping together priority queues to create a plurality of priority queue groups, wherein processing the billing request in order of the priority further comprises allocating system resources to the processing of a priority queue, and wherein the allocation of system resources corresponds to the priority value assigned to the priority queue group.

8. The method of claim 7, wherein the plurality of priority rules are determined by the service provider.

9. The method of claim 7, further comprising allocating a percentage of system resources corresponding to the priority value of said priority queue group.

10. The method of claim 9, wherein the priority queue group with a highest priority value is allocated a higher percentage of system resources than a priority queue group with a lower priority value.

11. The method of claim 7, wherein the text message relates to a vote for a poll.

12. The method of claim 7, wherein the text message relates to a contest.

* * * * *